March 29, 1966    JEAN-CLAUDE SIMON ETAL    3,243,145
SPACE NAVIGATION SYSTEMS
Filed Oct. 30, 1961                          3 Sheets-Sheet 2

United States Patent Office 3,243,145
Patented Mar. 29, 1966

3,243,145
SPACE NAVIGATION SYSTEMS
Jean-Claude Simon and Erich Spitz, both of Paris, France, assignors to Compagnie Generale de Telegraphie Sans Fil, a corporation of France
Filed Oct. 30, 1961, Ser. No. 148,313
Claims priority, application France, Nov. 2, 1960, 842,736
3 Claims. (Cl. 244—14)

The present invention relates to space navigation and, more particularly, to a system for controlling the direction of a missile.

The invention is based on the fact that, within a given frequency band, there is a definite correlation between the high-frequency fields radiated by a given radio source, such as a radio-star, as measured at different locations.

In other terms, if a noise wave from a radio star is picked up at a given location, with an amplitude $s(t)$, the same noise will be picked up at an adjacent location with an amplitude $s(t-\tau)$, where $\tau$ is a constant depending upon the velocity of light $c$ and the distance $d$ between the two locations considered, assuming this distance to be small with respect to the distances between these locations and the radio-star.

A system according to the invention comprises a plurality of aerials associated with the missile and coupled to a common receiver circuit through delay circuits associated with differential correlator means. These differential correlator means deliver error voltages when the correlation function between the signals received departs from its maximum value.

The invention will be best understood from the following description and appended drawings, wherein.

Figure 1:
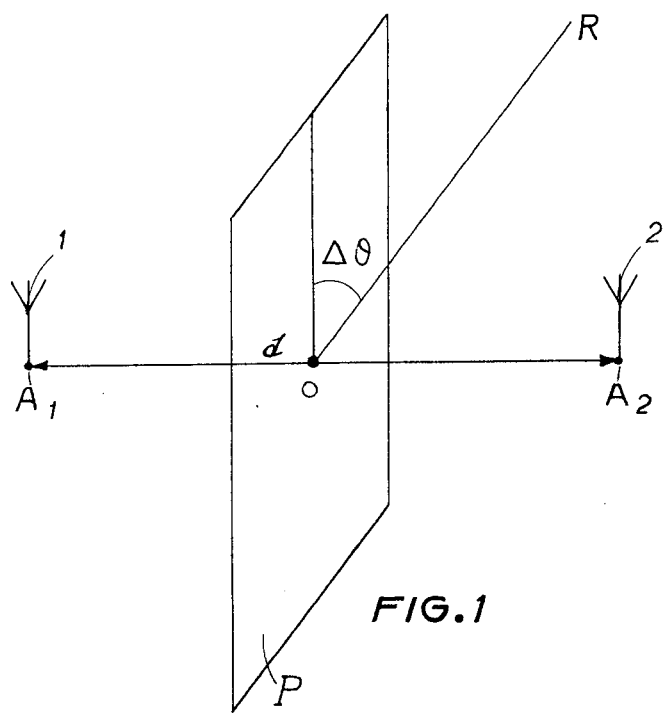
FIG. 1 is a diagram disclosing the principle of the invention.

In FIG. 1, there are shown two aerials 1 and 2 borne by a missile and receiving radiations from a radio star located at infinity, i.e. at a very great distance from aerials 1 and 2. If $\Delta\theta$ is the angle the direction OR of the radio-star forms with the plane of symmetry P of the two aerials 1 and 2, the radiation from the radio source, which may be a star or the sun, is collected as an interference wave, the instantaneous amplitude of which is a function $s(t)$. Assuming angle $\Delta\theta$ to be small with respect to the width of the radiation pattern of the aerials, their respective phase centers $A_1$ and $A_2$ will receive ultra high frequency fields $s(t)$ and $s(t-\tau)$, where $\tau=d/c\cdot\Delta\theta$, $c$ being the velocity of light, $d$ being the distance between the two aerials $A_1$ and $A_2$.

In other words, the signal received by one of the aerials, say aerial 2, will be the same as the received by aerial 1, but will be delayed by the value $\tau$.

A correlation fuction:

$$f(\tau)=\overline{s(t)\cdot s(t-\tau)}$$

exists between the fields collected by the aerials, the value of which is:

$$f(\tau)=\lim_{T\to\infty} 1/T\int_0^T s(t)\cdot s(t-\tau)\cdot dt$$

It is known that this function will be a maximum for $\tau=0$.

The function $f(\tau)$ being a maximum, its derivative $df/d\tau$ is zero. However, if $\tau$ differs from 0, i.e. if $\Delta\theta$ differs from 0, the derivative $df/d\tau$ is no longer equal to zero.

Thus, if differential correlator circuits are associated with aerials 1 and 2, which are capable of generating error voltages proportional to $df/d\tau$ or $f'(\tau)$, it will be possible to apply these error voltages to the missile engines, causing the missile to change its direction until $f'(\tau)$ is again equal to zero, i.e. $\Delta\theta=0$.

It will thus be possible to maintain the phase centers of both aerials in a plane perpendicular to the direction of the radio-star, thus determining the plane in which the missile is caused to move.

A third aerial makes it possible to determine the direction of the axis of the missile, with respect to the radio stars and, if desired, to stabilize this direction.

Figure 2:
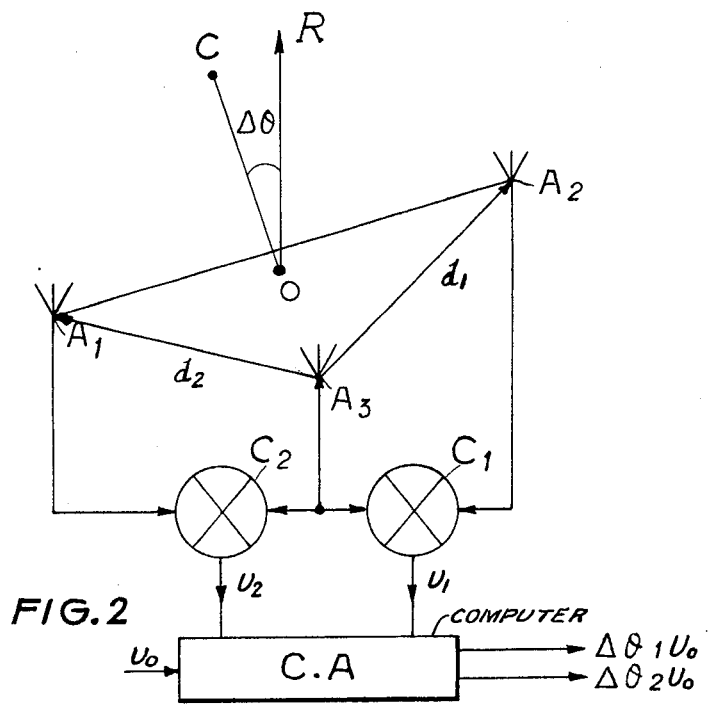
FIG. 2 is a diagrammatic view of an embodiment of a space navigation system according to the invention.

FIG. 2 shows, very diagrammatically and by way of example, a three aerial system. The three aerials, the respective phase centers of which are $A_1$, $A_2$, $A_3$ are associated with the missile and define the direction OC in which the missile moves.

This direction is perpendicular to the plane comprising points $A_1A_2A_3$ at the point of intersection O of the normal bisecting lines of triangle $A_1A_2A_3$. The problem is to render direction OC parallel to the radiation direction OR of the radio-star. To this end, aerials $A_3$ and $A_2$ are connected to a first differential correlator $C_1$ which produces a first error voltage $U_1=f'(\tau_1)$, $\tau_1$ being the delay $d_1/c\cdot\Delta\theta_1$, where $\Delta\theta_1$ is the angle of the plane P', which is the symmetry plane of $A_2$ and $A_3$, and OR, $d_1$ being length $A_2A_3$.

A second differential correlator $C_2$ produces a second error voltage $U_2=f'(\tau_2)$, $\tau_2$ being the delay $\tau_2=d_2/c\cdot\Delta\theta_2$ the angle of plane P", which is the symmetry plane of points $A_1$ and $A_3$, with direction OR, and $d_2$ being the distance $A_1A_3$. A computer CA receives voltages $U_1$ and $U_2$ and a reference voltage $U_0$, and then calculates the control voltages $U_0\Delta\theta_1$ and $U_0\Delta\theta_2$ to be applied to the missile engines, in order to cause direction OC to coincide with OR.

Figure 3:
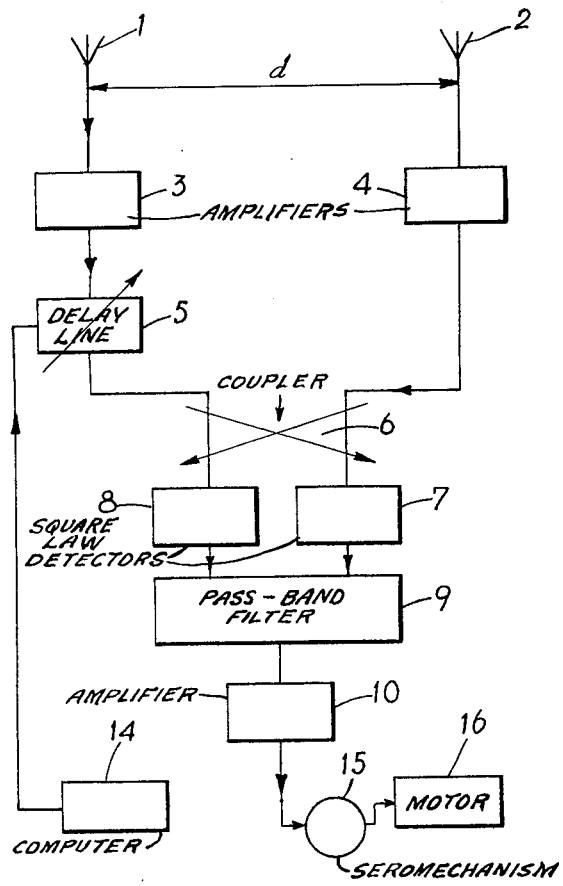
FIG. 3 is a block diagram showing the same system in more detail.

FIG. 3 shows a system according to the invention, comprising only two aerials.

The device in FIG. 3 comprises two aerials 1 and 2 respectively connected to ultra high frequency amplifiers 3 and 4, having the same pass-band which is centered, for example, about 10,000 mc./s.

Amplifier 3 feeds a delay line 5 providing an adjustable delay. The signals derived from the delay line 5 and from amplifier 4 are applied to the two inputs of a 3 db directional coupler 6. The two outputs of coupler 6 feed respectively two square law detectors 7, 8, arranged in opposition. The outputs of detectors 7 and 8 are applied to a narrow low-pass-band filter 9, at the output of which appears an error voltage. This error voltage is amplified in a low frequency amplifier 10 and controls a servo-mechanism 15.

A computer 14 controls the delay time of the delay line 5. This delay line may consist, for instance, of a ferrite phase-shifter. Servo 15 controls the missile control means 16.

Figure 4:
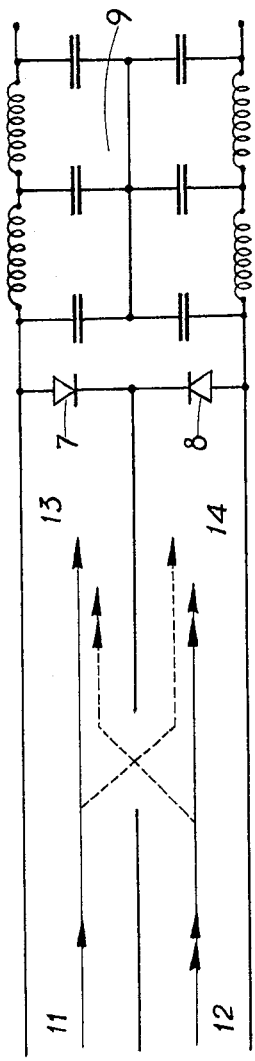
FIG. 4 is a diagrammatic view of a differential correlator.

FIG. 4 is an embodiment, given by way of example, of coupler 6, detectors 7 and 8 and filter 9. Coupler 6 comprises two input arms 11 and 12, and two output arms 13 and 14. At the output of arms 13 and 14 are connected in opposition, crystals 7 and 8; filter 9 comprises T-connected capacitors and resistors.

Disregarding for the time being the delay line 5 and computer 14, the unit operates as follows:

Considering the input signals $s(t)$ and $s(t-\tau)$ of arms 11 and 12 (FIG. 4) of coupler 6, it may be shown that the amplitudes of the signals in arms 13 and 14 are:

Arm 13

$$\frac{\sqrt{2}}{2}[s(t) + 1/\omega \cdot s'(t-\tau)]$$

Arm 14

$$\frac{\sqrt{2}}{2}[s(t-\tau) + 1/\omega \cdot s'(t)]$$

where $\omega$ is the angular speed of the central frequency of the frequency band of the high frequency amplifiers 3 and 4.

Crystals 7 and 8 being square law detectors arranged in opposition, the output voltage thereof is:

$$U(t) = \tfrac{1}{2}[s(t) + 1/\omega \cdot s'(t-\tau)]^2 - \tfrac{1}{2}[s(t-\tau) + 1/\omega \cdot s'(t)]^2$$

The mean value $\overline{U(t)}$ of this voltage as collected at the output of low-pass filter 9 is $$\overline{U(t)} = \frac{2}{\omega} \cdot f'(\tau)$$

since $$\overline{s^2(t)} = \overline{s^2(t-\tau)}$$

and $$\overline{s'^2(t)} = \overline{s'^2(t-\tau)}$$

$f(\tau)$ being the correlation function of $s(t)$.

In other words, the voltage $U(t)$ appearing at the output of filter 9 is proportional to the derivative $f'(\tau)$ of the correlation function. If this voltage is zero, the correlation function is a maximum, and $\tau=0$.

It will now be assumed that delay line 5 introduces a delay $\tau_0$, as determined by the computer 14, as a function of the direction desired as a function of time, causing the signal $s(t)$ to be delayed by this value $\tau_0$. The output voltage of device 9 will be zero for $\tau=\tau_0$, i.e. the error voltage will be zero if the missile is arranged for the plane of symmetry P to make an angle $\Delta\theta_0$ with the radio star direction, with $$\Delta\theta_0 = \frac{d}{c}\tau_0$$

Under these conditions, computer 14 will define as a function of time a flight program, if it computes values $\Delta\theta_0$ as a function of time. Filter 9 produces a corresponding error voltage which reacts on a servo 15 driving motor 16 of the missile, but causing, in fact, to vary the position thereof until the error voltage becomes zero, i.e. until $\tau=\tau_0$ and $\Delta\theta=\Delta\theta_0$.

Figure 5:
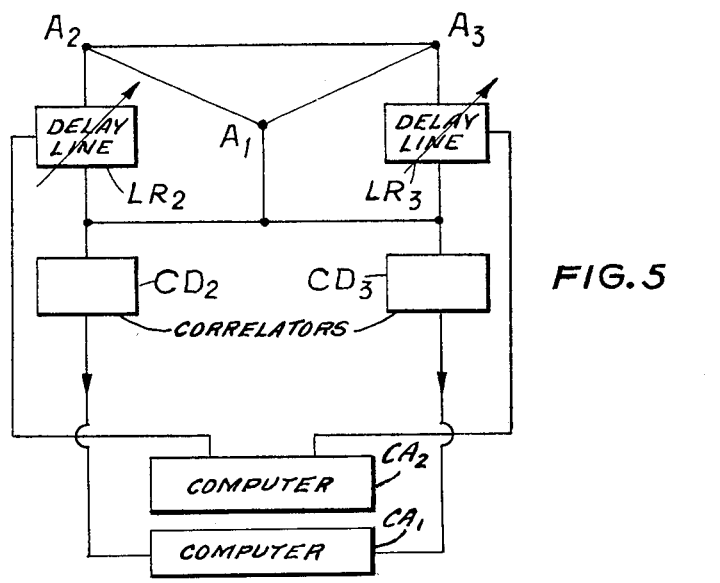
FIG. 5 is a diagrammatic view of another embodiment of the space navigation system according to the invention.

This invention makes it possible to insure space navigation with an assigned flight program. In this case, the device is that of FIG. 4, but comprises three aerials $A_1 A_2 A_3$ (FIG. 5).

Aerial $A_1$ is connected to the inputs of two correlators $CD_2$ and $CD_3$.

Correlator $CD_2$ is connected to aerial $A_2$ through a delay line $LR_2$ having a variable delay rate. Similarly, $CD_3$ is connected to $A_3$ by line $LR_3$. $CD_2$ and $CR_3$ deliver respectively error voltages $U_2$ and $U_3$, to a computer $CA_1$, which controls voltages $V_1$ and $V_2$, to be fed to the servomechanism SM controlling the engine of the missile.

A computer $CA_2$ controlling the delay lines $LR_2$ and $LR_3$ delivers at any instant the delay rates $\tau_2$ and $\tau_3$ corresponding to a predetermined program while $CD_2$ and $CD_3$ deliver the feedback voltages. According to this program, $\tau_1$ and $\tau_2$ are predetermined functions of time $t$.

The radio-source may be the sun or a radio star, or a given region of the sun. The delay lines used may be of any known type, such as, for example, ferrite controlled phase-shifters.

What is claimed is:

1. A navigation system for space vehicles comprising in combination: a first, a second and a third aerial having substantially the same operating frequency band, the same radiation pattern and respective outputs; two three db coupling means each having two input arms, respectively coupled to said outputs of said first and said second aerials and of said first and said third aerials, and two output arms; square law detectors respectively connected to said output arms, each of said detectors having an output; and computer means connected to said detector outputs for computing control voltages as a function of the angle between the axis of said radiation pattern and the direction corresponding to a predetermined space noise radiation source.

2. A navigation system for space vehicles comprising in combination: two aerials having substantially the same operating frequency band, the same radiation pattern and respective outputs; three db coupling means having two input arms, respectively coupled to said outputs of said aerials, and two output arms; two square law detectors respectively coupled to said two output arms and having respective outputs for delivering a control voltage as a function of the angle between the symmetry plane of said aerials and the direction corresponding to a predetermined space noise radiation source; a filter, coupled to said respective outputs, and having an output; and a servomechanism connected to said filter output.

3. A navigation system for space vehicles comprising in combination: two aerials having substantially the same operating frequency band, the same radiation pattern and respective outputs; delay line means having a controllable delay ratio coupled to one of said outputs; three db coupling means having two input arms respectively coupled to said one of said outputs of said aerials and said delay line means, said coupling means having two output arms; square law detectors respectively coupled to said two output arms and having respective outputs; a pass band filter connected to said respective outputs for delivering a control voltage as a function of the angle between the symmetry plane of said aerials and the direction corresponding to a predetermined space noise radiation source; a servomechanism fed by said control voltage for controlling said vehicle; and computing means, connected to said delay line means, for controlling said delay ratio.

References Cited by the Examiner

UNITED STATES PATENTS 2,166,991   7/1939   Guanella _____ 343—100.7

BENJAMIN A. BORCHELT, *Primary Examiner.*

CHESTER L. JUSTUS, SAMUEL FEINBERG,
*Examiners.*

A. E. HALL, L. L. HALLACHER, M. F. HUBLER,
*Assistant Examiners.*